US008423769B2

United States Patent
Han et al.

(10) Patent No.: US 8,423,769 B2
(45) Date of Patent: Apr. 16, 2013

(54) METHOD AND APPARATUS FOR GENERATING SECURITY CONTEXT

(75) Inventors: Lufeng Han, Beijing (CN); Zhiyong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 13/211,948

(22) Filed: Aug. 17, 2011

(65) Prior Publication Data

US 2012/0047367 A1 Feb. 23, 2012

(30) Foreign Application Priority Data

Aug. 19, 2010 (CN) .......................... 2010 1 0260772

(51) Int. Cl.
*H04L 9/00* (2006.01)
(52) U.S. Cl.
USPC .............. 713/168; 713/169; 713/171; 380/44
(58) Field of Classification Search .......... 713/168–171; 380/270, 277, 44
See application file for complete search history.

(56) References Cited

U.S. PATENT DOCUMENTS

| 7,624,422 B2 * | 11/2009 | Williams et al. .................. 726/1 |
| 7,991,387 B2 * | 8/2011 | Rowley et al. ................. 455/411 |
| 2007/0249352 A1 * | 10/2007 | Song et al. .................... 455/436 |
| 2011/0256855 A1 | 10/2011 | Wang |

FOREIGN PATENT DOCUMENTS

| CN | 1794878 A | 6/2006 |
| CN | 101730060 A | 6/2010 |
| CN | 101754398 A | 6/2010 |

OTHER PUBLICATIONS

Office Action issued in corresponding Chinese Patent Application No. 201010260772.0; mailed Jul. 4, 2012.
LTE, "3rd Generation Partnership Project; Technical Specification Group Core Network and Terminals; Mobile Radio Interface Layer 3 Specification; Core Network Protocols" Stage 3 (Release 9) 3GPP TS 24.008. V9.2.0, Mar. 2010.
LTE, "3rd Generation Partnership Project; Technical Specification Group Core Network and Terminals ; Non-Access-Stratum (NAS) Protocol for Evolved Packet System (EPS)" Stage 3 (Release 9) 3GPP TS 24.301. V9.2.0, Mar. 2010.

(Continued)

*Primary Examiner* — Hosuk Song
(74) *Attorney, Agent, or Firm* — Brinks Hofer Gilson & Lione

(57) ABSTRACT

A method and an apparatus for generating a security context are provided. The implementation of the method includes: receiving a first message carrying a network capability of a User Equipment (UE); and generating the security context according to the network capability of the UE carried in the first message if the network capability of the UE carried in the first message is inconsistent with the stored network capability of the UE. After the network capability of the UE changes, information carrying the network capability of the UE is sent to a network side, so as to inform the network side that the network capability of the UE changes; therefore the network side can obtain the network capability of the UE, generate the security context according to the changed network capability of the UE, and further trigger a Radio Resource Control (RRC) connection establishment process.

7 Claims, 2 Drawing Sheets

OTHER PUBLICATIONS

LTE, "3rd Generation Partnership Project; Technical Specification Group Radio Access Network; Evolved Universal Terrestrial Radio Access (E-UTRA) Radio Resource Control (RRC); Protocol Specification" (Release 9) 3GPP TS 36.331. V9.1.0, Dec. 2009.

LTE, "3rd Generation Partnership Project; Technical Specification Group Services and System Aspects" 3GPP System Architecture Evolution (SAE); Security Architecture (Release 9) 3GPP TS 33.401. V9.3.1, Apr. 2010.

* cited by examiner

METHOD AND APPARATUS FOR GENERATING SECURITY CONTEXT

CROSS-REFERENCE TO RELATED APPLICATIONS

This application claims priority to Chinese Patent Application No. 201010260772.0, filed on Aug. 19, 2010, which is hereby incorporated by reference in its entirety.

FIELD OF THE DISCLOSURE

The present disclosure relates to the field of communication technology, and in particular, to a method and an apparatus for generating a security context.

BACKGROUND

The Third Generation Partnership Project Long Term Evolution (3GPP LTE) is a system evolved from the Third Generation (3G) network, and is a mobile communication system based on the packet domain. The system includes a Mobile Station (MS), an Evolved Node B (eNB), an evolved Mobility Management Entity (MME), and a Serving Gateway (SGW)/Packet Data Node Gateway (PDNGW). The communication between the LTE network and an external data network is realized by connecting the external data network with the SGW/PDNGW. The MS is a terminal device, the eNB is a radio access device, and the MME and the SGW/PDNGW are core network devices.

In the LTE system, in order to ensure the security of communication between a User Equipment (UE) and a network side, it is specified in the current protocols that integrity protection is required for a SERVICE REQ message, that is, both the current UE and the MME store a set of corresponding security contexts respectively, and the security contexts include an integrity protection key, an encryption key, and an encryption and decryption protection/encryption and decryption algorithm. The message such as the SERVICE REQ required to be sent between the UE and the MME, and the security contexts currently stored by the UE and the MME should be used by the key and algorithm for an encryption protection.

After the network capability of the UE in the LTE changes, the process of paging the UE by the network side is as follows.

1. After the UE of the LTE registers successfully, if the network capability of the UE in an idle state is changed, a Tracking Area Update (TAU) process needs to be performed on the Non Access Stratum Evolved Packet System Mobility Management (NAS EMM), and the modified parameters are notified to the network. The network capability of the UE is indicated by an Information Element (IE) in the network, and is used by the UE to inform the core network of the algorithms of encryption and decryption, and to inform the core network of the integrity protection supported by the UE, for example, in the LTE system, a newly-added IE in relative to 2G/3G is used by the UE to inform the core network of the algorithms of encryption and decryption, and the integrity protection supported by the UE. As the current UE is in the idle state, the NAS EMM requests a Radio Resource Control (RRC) to establish an air interface RRC connection, and the connection establishment type of the request is a Mobile Originated (MO) SIGNAL. The RRC is a protocol module, and exists in both the UE and the network entity eNB, which may be implemented by software.

2. After the RRC of the UE side receives the connection establishment request of the MO SIGNAL type of the NAS, the RRC determines whether the access of the type is allowed according to access prohibition information in a system information of a current cell (the base station broadcasts the system information in a physical channel). If the access of the connection establishment type is prohibited, the RRC informs the NAS EMM that the connection establishment is failed, and the access of the MO SIGNAL type is prohibited for the cell.

3. The network side sends a paging message to the terminal to locate a position of the UE; and specifically, the MME sends the paging message to the eNB to page the UE.

4. The eNB pages the UE at an Ultimate User (Uu) interface.

5. After receiving the paging message, the RRC of the UE side sends the paging message to the NAS EMM.

6. As the EMM is in the access prohibition state of the MO SIGNAL type, after the NAS EMM receives the paging message, the NAS EMM is required to send a paging response message to the network side; specifically, the EMM is required to send the SERVICE REQ message to the evolved MME, and establishes a user plane bearer.

The network capability of the UE is changed, the UE no longer supports the algorithm of the security context stored by the MME, and the original security context becomes invalid, so at this time, the UE should not use the original security context for protection, and even the UE uses the invalid security context to perform an encryption protection on the SERVICE REQ message, the MME is unable to recognize the message, that is, the MME regards that the paging response is not received, and a new security context cannot be generated. As a result, the RRC connection establishment process should not be triggered. Furthermore, as the RRC connection establishment process cannot be triggered, the paging initiated by the network side is failed, resulting in that the network side cannot page the UE.

SUMMARY

Embodiments of the present disclosure provide a method and an apparatus for generating a security context, so as to establish the security context when a network capability of a UE changes.

In one embodiment of the present disclosure, a method for generating a security context may be realized through the following solutions: receiving a fist message carrying a network capability of a UE; and generating a security context according to the network capability of the UE in the first message if the network capability of the UE in the first message is inconsistent with the stored network capability of the UE.

A method for generating a security context is provided, where the method includes: determining, by a terminal device, whether a network capability of a UE changes; and sending, by the terminal device, a first message to an MME if the network capability of the UE changes, where the first message carries the network capability of the current UE, so that the MME generates the security context according to the network capability of the current UE.

An apparatus for generating a security context is provided, where the apparatus includes: a message receiving unit and a context generation unit. The message receiving unit is configured to receive a first message carrying a network capability of a UE. The context generation unit, configured to generate the security context according to the network capability of the UE carried in the first message if the network capability of the UE carried in the first message is inconsistent with the stored network capability of the UE.

A terminal device is provided, where the terminal device includes: a determination unit, a message generation unit, and a sending unit. The determination unit is configured to determine whether a network capability of a UE changes. The message generation unit is configured to generate a first message if the determination unit determines that the network capability of the UE changes, where the first message carries the network capability of the current UE. The sending unit is configured to send the first message to an MME, so that the MME generates a security context according to the network capability of the current UE.

The solutions have the following beneficial effects. After the network capability of the UE changes, information carrying the network capability of the UE is sent to a network side, so as to inform the network side that the network capability of the UE changes. In this way, the network side can obtain the network capability of the UE, generate the security context according to the changed network capability of the UE, and further trigger RRC connection establishment process; and furthermore, the network side can successfully initiate paging, so that the network side can page the UE.

BRIEF DESCRIPTION OF THE DRAWINGS

To illustrate the solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The solutions of the present disclosure will be clearly and completely described in the following with reference to the accompanying drawings. It is obvious that the embodiments described below are only part of rather than all of the embodiments of the present disclosure. All other embodiments obtained by persons skilled in the art based on the embodiments of the present disclosure without creative efforts shall fall within the protection scope of the present disclosure.

Figure 1:
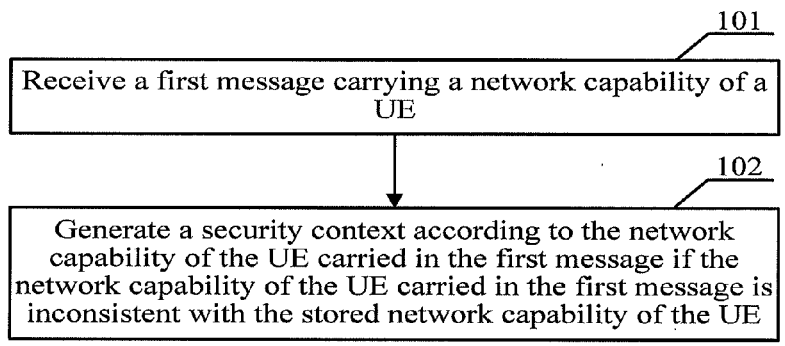
FIG. 1 is a schematic flow chart of a method according to an embodiment of the present disclosure.

An embodiment of the present disclosure provides a method for generating a security context. As shown in FIG. 1, the method includes the following steps.

In step 101, a fist message carrying a network capability of a UE is received.

The network capability of the UE is indicated by an IE in the network, and is used by the UE to inform the core network of algorithms of encryption and decryption, and the integrity protection supported by the UE.

Optionally, the first message is a SERVICE REQ message, and an optional IE of the SERVICE REQ message carries the network capability of the UE. Furthermore, the optional IE of the SERVICE REQ message may also carry the network capability of the UE and an optional message authentication code field, where the message authentication code field is configured to identity whether the SERVICE REQ message requires integrity protection. Evidently, in addition to the SERVICE REQ message, the first message may also be another message, that is, the message that is not limited by access prohibition of the MO SIGNAL type, for example, a newly generated message; and the embodiment of the present disclosure is not limited thereto. In subsequent embodiments, a specific format in which the SERVICE REQ message carries the network capability of the UE is given.

In step 102, the security context is generated according to the network capability of the UE carried in the first message if the network capability of the UE carried in the first message is inconsistent with the stored network capability of the UE.

If the first message is the SERVICE REQ message, in step 102, the specific implementation process of determining whether the network capabilities are consistent may be as follows: determining whether integrity protection is performed on the SERVICE REQ message; and determining whether the network capability of the UE carried in the SERVICE REQ message is consistent with the stored network capability of the UE if the integrity protection is not performed on the SERVICE REQ message.

Specifically, in step 102, the method for generating the security context may be:

respectively performing a SECURITY MODE COMMAND (SMC) with the NAS and the RRC to generate an encryption and decryption protection and/or encryption and decryption algorithm; and furthermore: generating an integrity protection key by performing a mutual Authentication and Key Agreement (AKA) procedure with the UE. Further detailed description is given in the subsequent embodiments.

Figure 2:
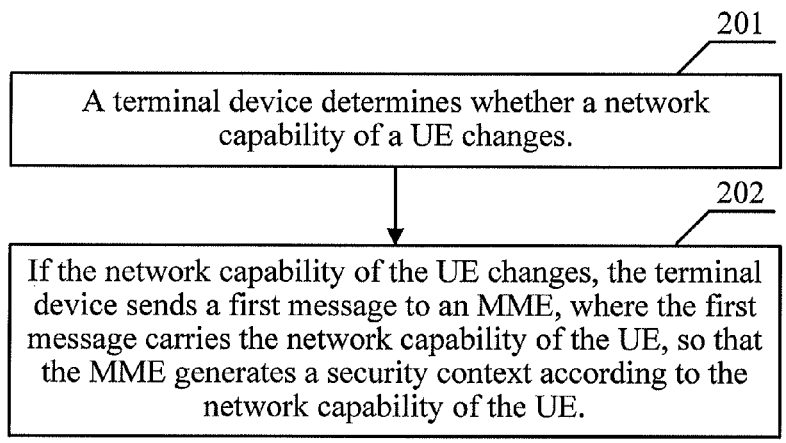
FIG. 2 is a schematic flow chart of a method according to an embodiment of the present disclosure.

According to the foregoing method embodiment, the execution body is a network side device, for example, the MME. A method for generating a security context is given below, and the method is executed by an execution body which is a UE device, where the terminal device may be a UE or a UE_EMM. As shown in FIG. 2, the method includes the following steps.

In step 201, the terminal device determines whether a network capability of the UE changes.

In step 202, if the network capability of the UE changes, the terminal device sends a first message to an MME, where the first message carries the network capability of the current UE, so that the MME generates the security context according to the network capability of the current UE.

Optionally, the first message is a SERVICE REQ message, and an optional IE in the SERVICE REQ message carries the network capability of the UE. The integrity protection is not performed on the SERVICE REQ message. Alternatively, the optional IE in the SERVICE REQ message carries the network capability of the UE and an optional message authentication code field. Evidently, in addition to the SERVICE REQ message, the first message may also be another message, for example, a newly generated message; and the embodiments of the present disclosure are not limited thereto. In subsequent embodiments, a specific format in which the SERVICE REQ message carries the network capability of the UE is given.

After the network capability of the UE changes, the information carrying the network capability of the UE is sent to a network side, so as to inform the network side that the network capability of the UE changes. The network side may determine whether the network capability of the current UE is consistent with the network capability of the UE stored at the network side, so that the network side can obtain the network capability of the current UE, generate the security context according to the changed network capability of the UE, and further trigger an RRC connection establishment process; furthermore, the network side can successfully initiate paging, so that the network side can page the UE. Furthermore, when the SERVICE REQ message is used to carry the network capability of the UE, there is no need to add a new message, and an original SERVICE REQ process at the UE side is maintained.

Figure 3:
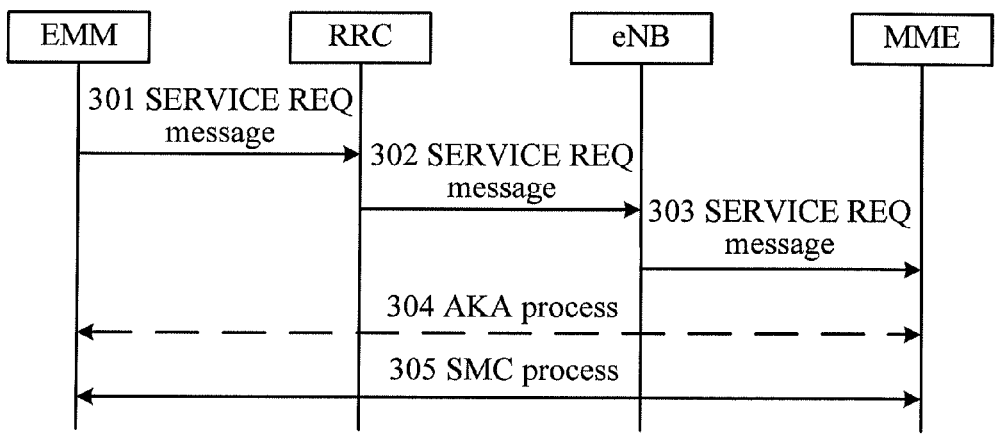
FIG. 3 is a schematic flow chart of a method according to an embodiment of the present disclosure.

In order to specifically describe a method for generating a security context, according to the embodiments of the present disclosure, a process that a network side pages a UE when a network capability of the UE changes is taken as an example. It should be understood that the security context may be used for other communication application, and is not limited to the application of paging the UE by the network side. The embodiment of the present disclosure is described by taking an example that a SERVICE REQ message carries information of the network capability of the UE and the execution body is a UE_EMM. As shown in FIG. 3, the method includes the following steps.

In step 301, after receiving a paging response message sent by the network side, the UE_EMM is required to send the SERVICE REQ message to an evolved MME, and establish a user plane bearer. The UE_EMM detects that the modified network capability of the UE does not support the current existing security context (that is, the security context stored at the UE side and the network side), and therefore when the UE generates the SERVICE REQ message, a short MAC IE may not be filled any longer, and instead an IE of the network capability of the UE is filled. At this time, the SERVICE REQ message is no longer under the integrity protection; when an NAS requests a UE_RRC connection establishment, the connection establishment type is a Mobile Terminated CALL (MT CALL).

Specifically, a format of the SERVICE REQ message is as shown in Tables 1 or 2.

TABLE 1

| IEI | Information Element | Type/Reference | Presence | Format | Length |
|---|---|---|---|---|---|
| | Protocol discriminator | Protocol discriminator 3GPP 9.2 | M | V | ½ |
| | Security header type | Security header type 3GPP 9.3.1 | M | V | ½ |
| | KSI and sequence number | KSI and sequence number 3GPP 9.9.3.19 | M | V | 1 |
| | Message authentication code (short) | Short MAC 3GPP 9.9.3.28 | M | V | 2 |
| | UE network capability | UE network capability 3GPP 9.9.3.34 | O | TLV | 3-14 |

TABLE 2

| IEI | Information Element | Type/Reference | Presence | Format | Length |
|---|---|---|---|---|---|
| | Protocol discriminator | Protocol discriminator 3GPP 9.2 | M | V | ½ |
| | Security header type | Security header type 3GPP 9.3.1 | M | V | ½ |
| | KSI and sequence number | KSI and sequence number 3GPP 9.9.3.19 | M | V | 1 |
| | Message authentication code (short) | Short MAC 3GPP 9.9.3.28 | O | TV | 3 |
| | UE network capability | UE network capability 3GPP 9.9.3.34 | O | TLV | 3-14 |

In Tables 1 and 2, M means Mandatory, O means Optional, V means Value, and TLV means Tag Length Value. In the format of Table 1, the message authentication code maintains unchanged; in the format of Table 2, the message authentication code is set to be optional; but a UE network capability field is added in Tables 1 and 2.

Furthermore, an optional IE in the SERVICE REQ message carries the network capability of the UE, and may also carry other IEs required to be indicated to the network in time, such as Discontinuous Reception (DRX), and a network capability of a Mobile Station (MS).

In step 302, after the connection between the UE_RRC and the eNB is established successfully, the UE_RRC sends the SERVICE REQ message without the protection and encryption to the eNB.

In step 303, the eNB sends the SERVICE REQ message without the protection and encryption to the MME. After receiving the SERVICE REQ message without the protection and encryption, the MME may acquire that the message is under no protection, and read the network capability of the UE in the optional IE; if the network capability of the UE is read successfully, it means that the network capability of the UE changes, the network capability of the UE may not support the current security context, and the MME may regenerate an algorithm, or regenerate an algorithm key and an integrity protection key, where the integrity protection key is generated in step 304, and the algorithm is generated in step 305.

In step 303, corresponding to the formats in Tables 1 or 2, the MME may read the network capability of the UE by using the following means. As for Table 1, after the determination, if it is found that the UE network capability IE exists, and a new UE network capability does not match the current security context, the message authentication code of the IE is not determined, that is, it is no longer determined whether the integrity protection of the message is successful. As for Table 2, after the determination, if it is found that the SERVICE REQ is under no protection, it is determined whether the UE network capability in the optional IE exists.

In step 304, the MME determines, according to the requirement of the network side, whether to perform a new AKA procedure. In the AKA procedure, the MME and the terminal authenticate with each other and generate a new integrity protection key used for the subsequent encryption and the integrity protection. The Step 304 is optional, and step 305 may be directly performed.

In step 305, the MME performs an SMC process to negotiate a new algorithm with the UE and the eNB, and generates a new key, integrity protection key, and middle key (KENB*)

according to the new algorithm. After the UE NAS and UE_RRC negotiate the new key and algorithm with the eNB and MME, the security context is reestablished completely. Then the user plane bearer is established according to the security context, so as to respond to a UE call.

After the network capability of the UE changes, information carrying the network capability of the UE is sent to the network side, so as to inform the network side that the network capability of the UE changes; therefore the network side can obtain the network capability of the UE, generate the security context according to the changed network capability of the UE, and further trigger an RRC connection establishment process; furthermore, the network side can successfully initiate the paging, so that the network side can page the UE. Furthermore, when the SERVICE REQ message is used to carry the network capability of the UE, there is no need to add a new message, and an original SERVICE REQ process at the UE side is maintained.

Figure 4:
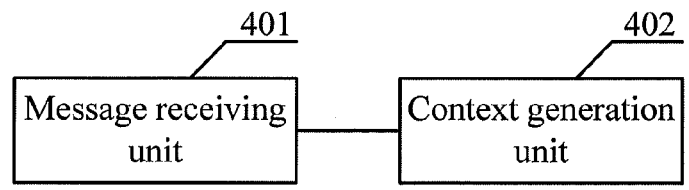
FIG. 4 is a schematic structural view of an apparatus according to an embodiment of the present disclosure.

An embodiment of the present disclosure provides an apparatus for generating a security context. As shown in FIG. 4, the apparatus includes a message receiving unit 401 and a context generation unit 402.

The message receiving unit 401 is configured to receive a first message carrying a network capability of a UE.

The context generation unit 402 is configured to generate the security context according to the network capability of the UE carried in the first message if the network capability of the UE carried in the first message is inconsistent with a stored network capability of the UE.

Figure 5:
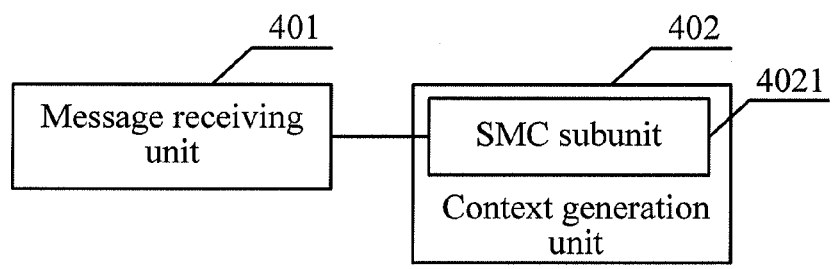
FIG. 5 is a schematic structural view of an apparatus according to an embodiment of the present disclosure.

Optionally, as shown in FIG. 5, the context generation unit 402 includes an SMC subunit 4021.

The SMC subunit 4021 is configured to perform SMC with an NAS and an RRC respectively to generate an encryption and decryption protection algorithm and/or an encryption and decryption algorithm. In the encryption and decryption protection algorithm, the message length is usually increased. Some bits may be added in the message, and the receiver check the added bits by the decryption protection algorithm to determine whether the message is safe. In the encryption and decryption algorithm, the length of the message is usually not changed in the encryption. However, the contents of a message may be processed in some way, e.g. the sequence of bits in the message may be reassigned. The receiver can recover the original sequence in the message by the decryption algorithm.

Figure 6:
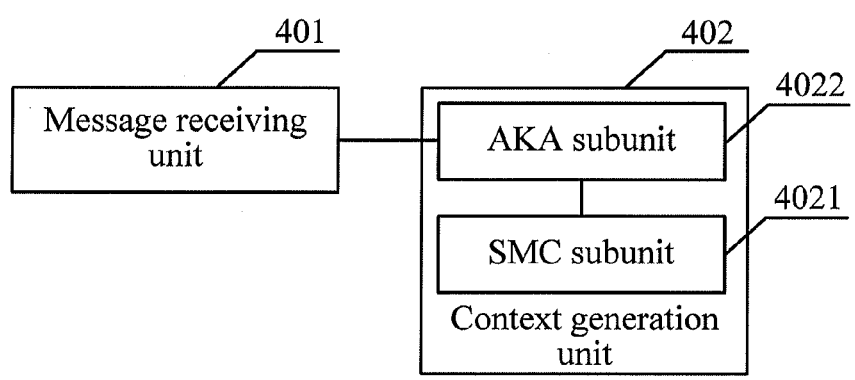
FIG. 6 is a schematic structural view of an apparatus according to an embodiment of the present disclosure.

As shown in FIG. 6, the context generation unit 402 further includes an AKA subunit 4022.

The AKA subunit 4022 is configured to generate an integrity protection key by performing a mutual AKA procedure with the UE.

Figure 7:
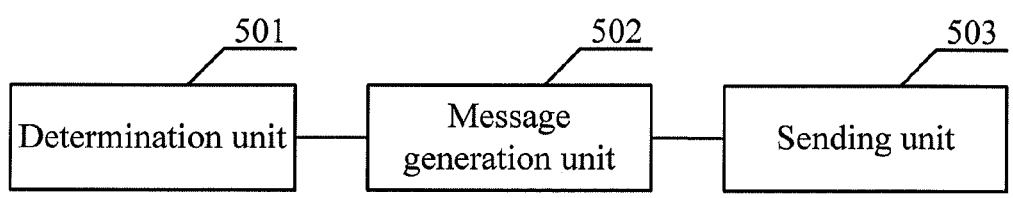
FIG. 7 is a schematic structural view of a terminal device according to an embodiment of the present disclosure.

An embodiment of the present disclosure provides a terminal device. As shown in FIG. 7, the terminal device includes a determination unit 501, a message generation unit 502, and a sending unit 503.

The determination unit 501 is configured to determine whether a network capability of a UE changes.

The message generation unit 502 is configured to generate a first message if the determination unit 501 determines that the network capability of the UE changes, where the first message carries the network capability of the current UE.

The sending unit 503 is configured to send the first message to an MME, so that the MME generates a security context according to the network capability of the current UE.

Specifically, the message generation unit 502 is configured to generate a SERVICE REQ message, and the network capability of the UE is carried in an optional IE of the SERVICE REQ message, where the integrity protection is not performed on the SERVICE REQ message; alternatively, the network capability of the UE is added in the optional IE of the SERVICE REQ message, and a message authentication code field is set to be optional.

According to the embodiments, after the network capability of the UE changes, the terminal sends the information carrying the network capability of the UE to the network side, so as to inform the network side that the network capability of the UE changes; therefore the network side can obtain the network capability of the UE, generate the security context according to the changed network capability of the UE, and further trigger an RRC connection establishment process; furthermore, the network side can successfully initiate paging, so that the network side can page the UE.

Those of ordinary skill in the art should understand that all or part of the steps of the method according to the embodiments of the present disclosure may be implemented by a program instructing relevant hardware. The program may be stored in a computer readable storage medium. The storage medium may be a ROM, a magnetic disk, or an optical disk.

According to the embodiments of the present disclosure, the method and apparatus for generating the security context are described in detail above. The principle and implementation of the present disclosure are described herein through specific examples. The description about the embodiments of the present disclosure is merely provided for better understanding of the method and core ideas of the present disclosure. Persons of ordinary skill in the art can make variations and modifications to the present disclosure on the basis of the specific embodiments and application scopes according to the ideas of the present disclosure. Therefore, the specification shall not be construed as a limit to the present disclosure.

What is claimed is:

1. A method for generating a security context, comprising:
receiving a fist message carrying a network capability of a User Equipment (UE); and
generating a security context according to the network capability of the UE in the first message if the network capability of the UE in the first message is inconsistent with a stored network capability of the UE, and
wherein generating the security context further comprises: generating an integrity protection key by performing a mutual Authentication and Key Agreement (AKA) procedure with the UE.

2. The method according to claim 1, wherein generating the security context comprises:
performing SECURITY MODE COMMAND (SMC) with a Non Access Stratum (NAS) and a Radio Resource Control (RRC) of the UE respectively to generate at least one of an encryption and decryption protection algorithm and an encryption and decryption algorithm.

3. A method for generating a security context, comprising:
receiving a first message carrying a network capability of a User Equipment (UE);
generating a security context according to the network capability of the UE in the first message if the network capability of the UE in the first message is inconsistent with a stored network capability of the UE, wherein the first message comprises a SERVICE REQ message, and the network capability of the UE in the first message is carried in an optional Information Element (IE) in the SERVICE REQ message;
determining whether integrity protection is performed on the SERVICE REQ message; and
determining whether the network capability of the UE carried in the optional IE in the SERVICE REQ message is consistent with the stored network capability of the UE if the integrity protection is not performed on the SERVICE REQ message.

4. A method for generating a security context, comprising:
   determining, by a terminal device, whether a network capability of a User Equipment (UE) changes; and
   sending, by the terminal device, a first message to a Mobility Management Entity (MME) if the network capability of the UE changes, wherein the first message carries the network capability of the UE, and wherein the MME generates an integrity protection key by performing a mutual Authentication and Key Agreement (AKA) procedure with the UE.

5. The method according to claim 4, wherein the first message is a SERVICE REQ message, the network capability of the UE is carried in an optional Information Element (IE) of the SERVICE REQ message, and integrity protection is not performed on the SERVICE REQ message.

6. A terminal device, comprising:
   a determination unit, configured to determine whether a network capability of a UE changes;
   a message generation unit, configured to generate a first message if the determination unit determines that the network capability of the UE changes, wherein the first message carries the network capability of the UE; and
   a sending unit, configured to send the first message to a Mobility Management Entity (MME), wherein the MME generates an integrity protection key by performing a mutual Authentication and Key Agreement (AKA) procedure with the UE.

7. The terminal device according to claim 6, wherein the message generation unit is configured to generate a SERVICE REQ message, and the network capability of the UE is carried in an optional Information Element (IE) of the SERVICE REQ message, and wherein integrity protection is not performed on the SERVICE REQ message.

* * * * *